United States Patent [19]

West

[11] Patent Number: 5,425,529
[45] Date of Patent: Jun. 20, 1995

[54] PNEUMATIC MEMBRANE SWITCHES AND SWITCH ASSEMBLY

[76] Inventor: Joe E. West, P.O. Box 555, Meridian, Tex. 76665

[21] Appl. No.: 125,485

[22] Filed: Sep. 22, 1993

[51] Int. Cl.⁶ .................................................. F16K 31/00
[52] U.S. Cl. ................................. 251/335.2; 251/339
[58] Field of Search .......................... 251/335.2, 339

[56] References Cited

U.S. PATENT DOCUMENTS

| | | | |
|---|---|---|---|
| 2,623,785 | 12/1952 | Henchert | 251/335.2 |
| 2,693,932 | 11/1954 | Richards | 251/335.2 X |
| 2,734,773 | 2/1956 | Ivins | 251/335.2 X |
| 4,667,931 | 5/1987 | Egert | 251/335.2 X |

*Primary Examiner*—Robert G. Nilson
*Attorney, Agent, or Firm*—Daniel V. Thompson

[57] ABSTRACT

A pneumatic membrane switch includes a body having an opening and a valve disposed within the opening. An actuator stem extends from the end of the valve, and the actuator stem is adapted to open the valve when moved inwardly with respect to the valve body. A flexible membrane covers the opening and is shiftable between standby and actuate positions. The membrane contacts and moves the actuator stem inwardly to open the valve when the membrane is shifted to the actuate position.

4 Claims, 3 Drawing Sheets

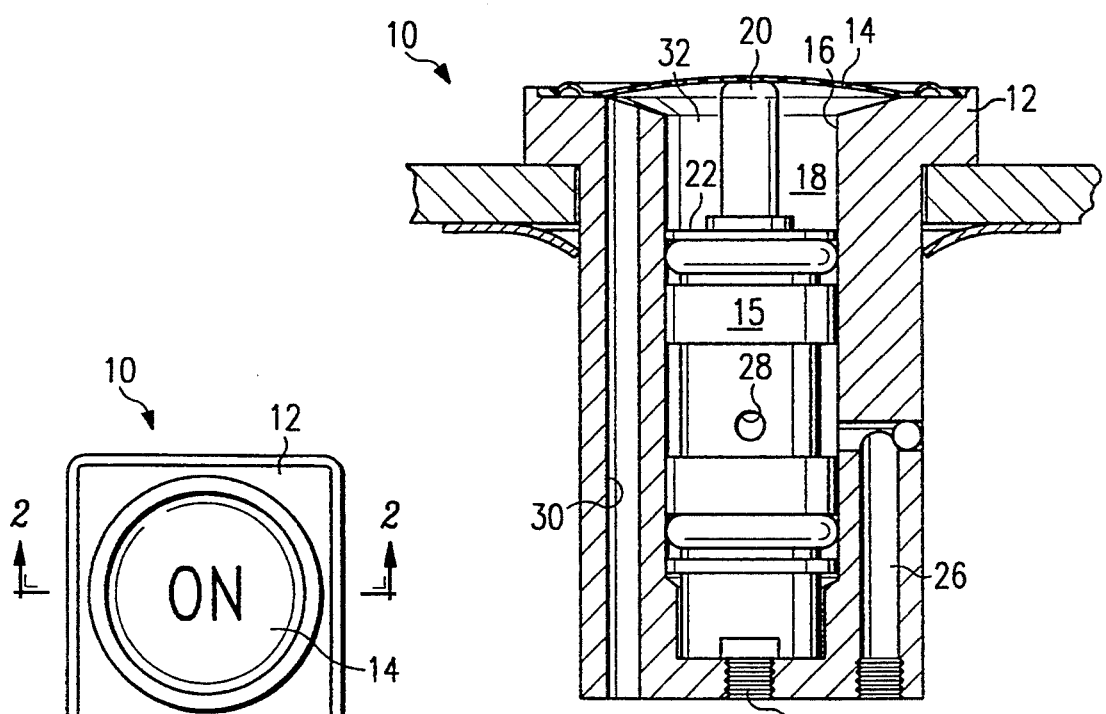
FIG. 1
FIG. 2
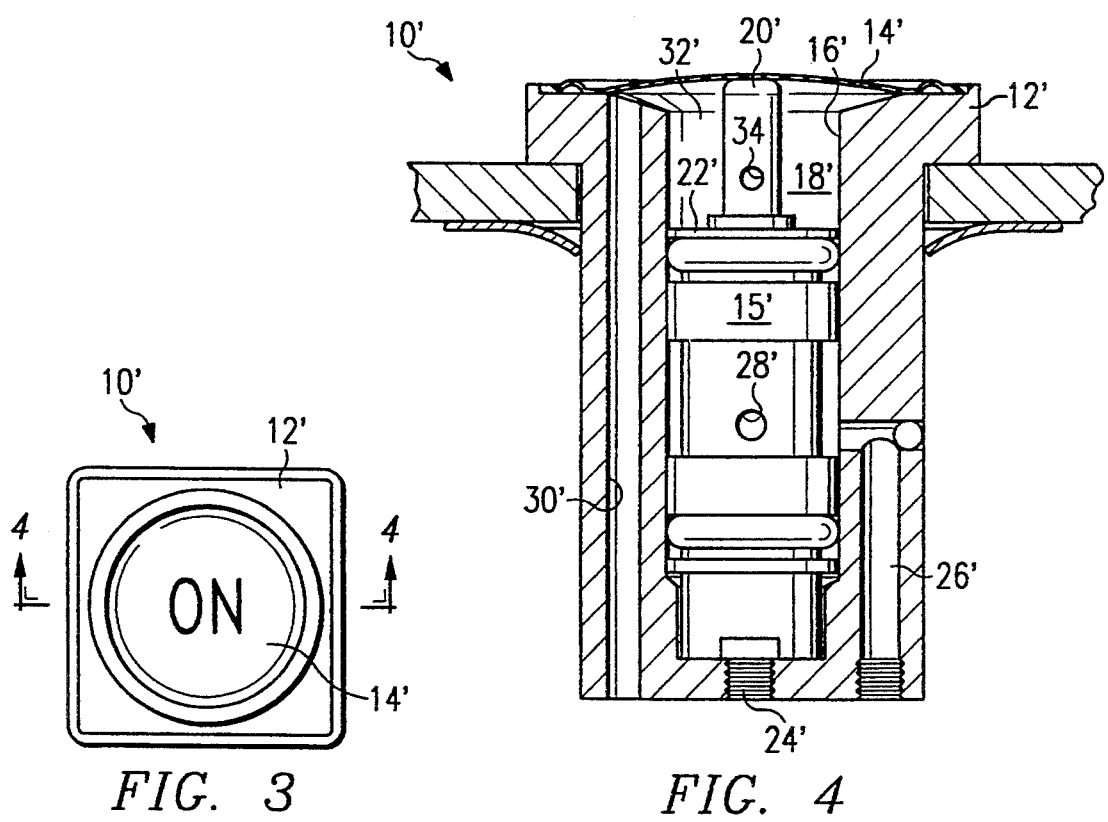
FIG. 3
FIG. 4

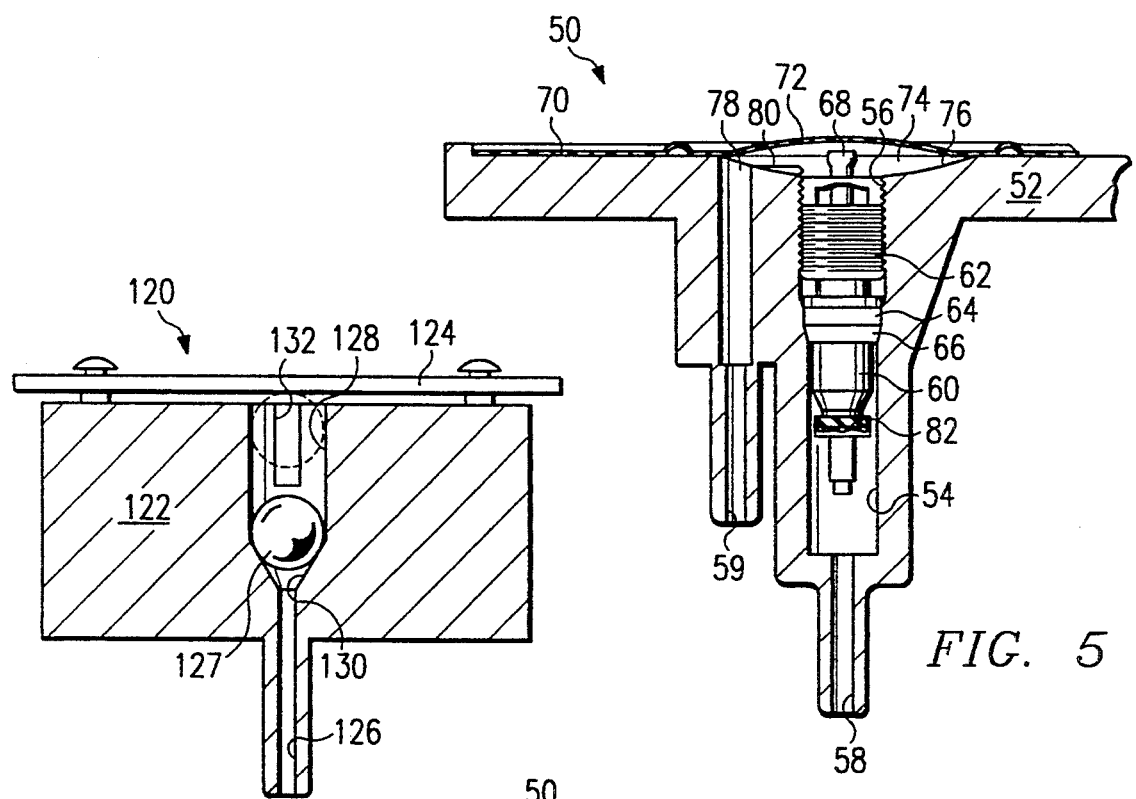
FIG. 5
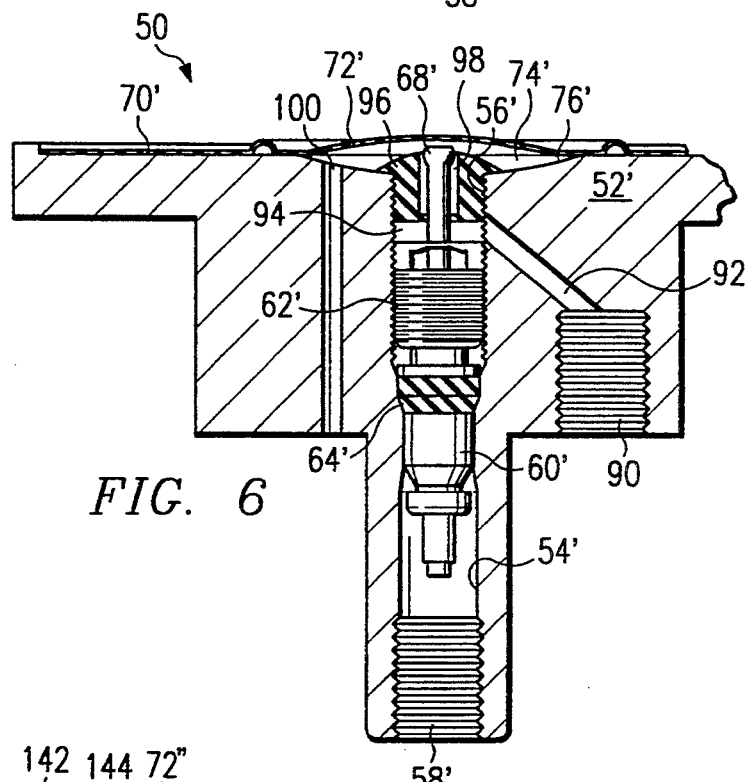
FIG. 6
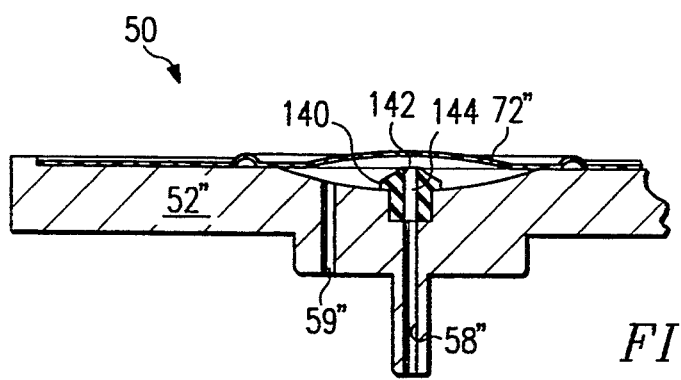
FIG. 7
FIG. 8

PNEUMATIC MEMBRANE SWITCHES AND SWITCH ASSEMBLY

FIELD OF INVENTION

This invention relates to pneumatic control systems, and more particularly to switches and switch assemblies for switching control pressures.

BACKGROUND ART

Various types of discrete valves have been used in the past to modulate and switch control pressure in pneumatic systems. A drawback of prior valves, however, is that they are relatively bulky and expensive, such that compact and inexpensive pneumatic control systems have not heretofore been known.

In addition, membrane switches are common in the electrical control field, being used in such familiar items as calculators, computers and appliances as well as industrial electrical control applications. The advantages of a membrane switch includes the ability to seal the switching apparatus behind the membrane and the ability to utilize compact switching components such as printed circuits and switches formed of conductive layers formed on the circuit boards.

Notwithstanding the advantages of the membrane type electrical controls, it has not heretofore been known to utilize membrane switch technology in conjunction with pneumatic controls. The result of this technology gap has been the inability to incorporate membrane switch techniques into pneumatic controllers for such items as, for example, medical devices.

SUMMARY OF THE INVENTION

The present invention includes a pneumatic membrane switch and unitary switch assembly that combine the advantages of membrane switch construction with pneumatic control apparatus. In a preferred embodiment, the pneumatic membrane switch includes a body having a valve disposed within an opening in the body, with a flexible membrane covering the opening and being shiftable between standby and actuate positions. In the actuate position, the membrane contacts and moves an actuator stem of the valve to open the valve. The valve is closed when the membrane is in the standby position.

The present invention has a number of applications; for example, a medical device known as a hydrodissection pump has been developed wherein all pumping and switching actions are controlled pneumatically by a switch assembly of the present invention. In the switch assembly, seven individual pneumatic switches are contained within a unitary body, with a unitary membrane covering and sealing the body to provide the various control functions. The membrane is only approximately four inches by three inches, with substantial blank spaces between the valve positions.

BRIEF DESCRIPTION OF THE DRAWINGS

A more complete understanding of the invention and its advantages will be apparent from the Detailed Description taken in conjunction with the accompanying Drawings in which:

FIG. 1 is a top view of a first embodiment of a membrane switch constructed in accordance with the invention;

FIG. 2 is a sectional view taken along the lines 2—2 of FIG. 1;

FIG. 3 is a view similar to FIG. 1, with the switch being configured for three-way operation;

FIG. 4 is a sectional view taken along lines 4—4 of FIG. 3;

FIG. 5 is a partially broken away side view of a pneumatic membrane switch assembly of the present invention;

FIG. 6 is a view similar to FIG. 5 with the switch configured for three-way operation;

FIG. 7 is a partially broken away side view of a sound generating device adapted for use with the switches of the present invention;

FIG. 8 is a partially broken away side view of a third embodiment of a pneumatic membrane switch.

DETAILED DESCRIPTION

Figure 9:
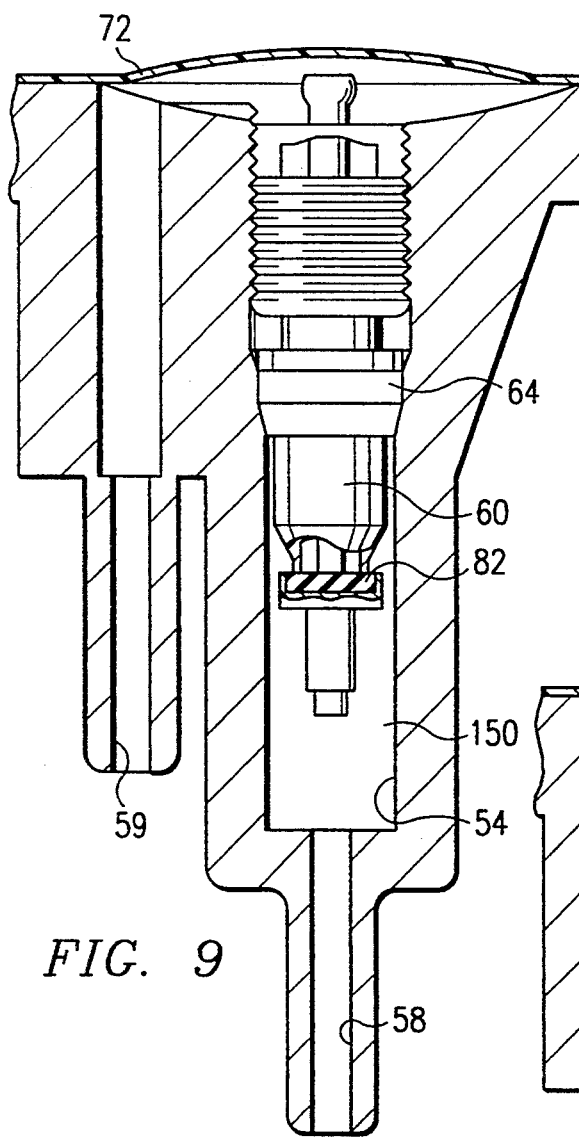
FIGS. 9 and 10 are partially broken away side views of the switch of FIG. 5 in operation.

Referring initially to FIGS. 1 and 2, where like numerals indicate like and corresponding elements, switch 10 includes a body 12, a membrane 14 and a valve 15. Body 12 includes cylindrical walls 16 defining an opening 18. Actuator stem 20 extends from end 22 of valve 15. Actuator stem 20 is adapted to open valve 15 when moved inwardly with respect to body 12. In the preferred embodiment illustrated, valve 15 is a poppet valve manufactured by Clippard.

Flexible membrane 14 covers opening 18 and is shiftable between standby and actuate positions. Membrane 14 is shown in the standby position in FIG. 2. Membrane 14 contacts and moves actuator stem 20 inwardly to open valve 15 when membrane 14 is shifted to the actuate position.

Opening 18 has an inlet 24 and an outlet 26. Valve 15 is adapted to seal fluid pressure applied to inlet 24 and release pressure to outlet 26 by way of passageway 28 when membrane 14 is shifted to the actuate position. Vent 30 communicates with the underside of membrane 14 to prevent the buildup of pressure in upper portion 32 of opening 18.

Referring now to FIGS. 3 and 4, reference numerals 10' through 32' refer to elements identical to those just described with respect to FIGS. 1 and 2. Switch 10', however, is especially adapted for three-way operation as opposed to the two-way operation of the switch of FIGS. 1 and 2.

A passageway 34 is formed in the upper portion of actuator stem 20' in communication with portion 32' of opening 18'. Pressure is held at outlet 26' as long as the membrane is in the actuate position, however, pressure is released to portion 32' and vent 30' when the membrane is shifted to the standby position. Those skilled in the art will recognize that it is often times desirable to undo the work done by the provision of pressure at outlet 26', so in switch 10' the release of pressure at outlet 26' to vent 30' is accomplished in three-way valve fashion.

Referring now to FIG. 5, a pneumatic membrane switch assembly 50 incorporates a second embodiment of the pneumatic membrane switch of the present invention. A unitary injection molded body 52 has a plurality of main bores 54 formed therein. Each main bore 54 has a cylindrical wall 56 between an inlet 58 and an outlet 59. Only one of the plurality of main bores 54 is shown in FIG. 5, it being understood that the overall assembly 50 is comprised of a plurality of essentially identical pneumatic membrane switches of which FIG. 5 is typical.

A conventional tire core valve 60 has external threads 62 engaged with threads formed on cylindrical wall 56. A resilient body seal 64 engages a tapered wall 66 formed in main bore 54. Valve 60 is fixed in main bore 54 by way of threads 62 and forms a pressure tight seal across bore 54 by way of body seal 64. An actuator stem 68 extends out of main bore 54, as shown.

A unitary membrane 70 has a plurality of shiftable sections 72. One shiftable section 72 covers each main bore 54 to form a pressure tight compartment 74 with the outlet 59 associated with bore 54. Each shiftable section 72 is depressible inwardly to contact the actuator stem 68 to release pressure from the inlet 58 to the outlet 59.

Body 52 has a concave surface 76 about each main bore 54 to support the membrane shiftable sections 72 when depressed. Concave surface 76 and outlet 59 form parts of the pressure tight compartment 74, with the outlet 59 having an end 78 formed in concave surface 76. Support bars 80 are formed in concave surface 76 to permit communication between valve 60 and end 78 when the membrane is in the actuate position.

Tire core valve 60 is conventional, although special low pressure versions are available for sealing down to pressures as low as 2 psi. In conventional fashion, a captured seal element 82 provides the seal between the lower and upper portions of the valve.

Referring now to FIG. 6, switch assembly 50 may also include one or more three-way pneumatic switches formed by elements 52' through 76' as described above. An outlet 90 communicates with a passageway 92 leading to an intermediate portion 94 of main bore 54'. A resilient seal member 96 is fixed in opening 54' and has a central aperture 98 surrounding actuator stem 68'. Body 52' has a vent 100 in addition to outlet 90 and inlet 58'. Pressure is held at outlet 90 by pressure tight contact between the membrane shiftable section 72' and seal member 96 when the membrane is in the actuate position, and pressure is released to vent 100 when the membrane is shifted to the standby position.

Referring now to FIG. 7, a sound generating device 120 includes a main body 122 with a loosely attached sounding bar 124. Inlet 126 is connected to, for example, outlet 59 of FIG. 5 by way of flexible tubing. A steel or plastic ball 127 is loosely fitted in vertically oriented bore 128, resting on tapered wall 130. An exhaust slot 132 is provided at the upper end of bore 128. When pressure is released from outlet 59 to inlet 126, ball 127 is forced to raise upwardly and strike sounding bar 124 before pressure is released from exhaust slot 132. An audible signal is thus produced to signal the user that the switch has been shifted from the standby to the actuate position. FIG. 7 illustrates only one embodiment of a sound generating device. Other types of sound generating devices include reed type sound devices that are actuated by airflows and have no moving parts.

Referring now to FIG. 8, one or more third embodiments of a pneumatic membrane switch can be incorporated in pneumatic switch assembly 50. In this embodiment, inlet 58" and outlet port 60" are provided in body 52". A resilient insert 140 is disposed across inlet port 58" and has walls 142 defining an aperture 144 in communication with inlet 58" and outlet 59". Membrane shiftable section 72" is adapted to shift inwardly toward insert 120 between standby and actuate positions. Membrane shiftable section 72" seals aperture 144 in the actuate position to interrupt communication between the inlet and outlet port. The switch of this embodiment is particularly adapted for use in momentarily blocking a flow of bleed fluid, in conventional fashion.

Figure 10:
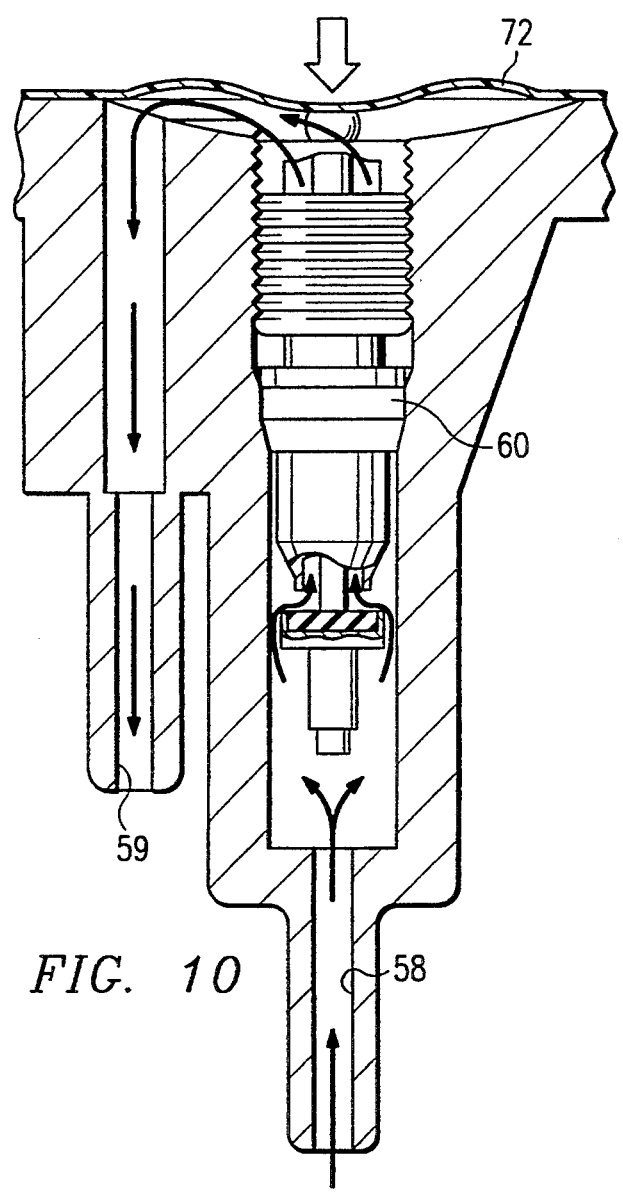

Referring now to FIGS. 9 and 10, the operation of a two-way switch constructed as shown in FIG. 5 is illustrated. In the standby position, illustrated in FIG. 9, pressure at inlet 58 is trapped in lower portion 150 of main bore 54 by the operation of body seal 64 and captured seal element 82. Outlet 59 communicates with the atmosphere or, optionally, with a sound generating device as shown in FIG. 7. FIG. 10 illustrates the switch as shiftable section 72 is moved to the actuate position. As shown by the arrows, fluid pressure is adapted to flow through tire core valve 60 and under shiftable section 72 to outlet 59.

The pneumatic membrane switches and switch assembly of the present invention provide numerous advantages over prior forms of pneumatic controls. In the case of the switch assembly, the individual switches can be located as close as three-quarter inch centers to form a compact switch assembly adapted for relatively complex devices, such as the hydrodissection device mentioned above. Presently available discrete push button pneumatic valves are simply too bulky, complex and expensive to be arranged to form a compact control panel for a complex device. Utilization of a membrane provides a rugged switch assembly for harsh environments. A totally weather proof and environmental hazard proof system can be provided. Where injection molded bodies are used in conjunction with tire core valves, complex switch assemblies can be custom made at substantially less cost than would be possible with discrete valves. Membranes are relatively easy to produce and print with custom graphics illustrating the available control features. In the port blocking embodiment of FIG. 8, extremely fast, compact pneumatic control is possible by using by using low pressure bleed air and apertures of 20 to 30 thousandths. An advantage of the bleed air type of switching, in addition to the speed and simplicity, is that the switch is self cleaning due to the constant bleed flow.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A pneumatic membrane switch, comprising:
   a body having an opening;
   a valve disposed within the opening, with an actuator stem extending from an end of the valve, and the actuator stem adapted to open the valve when moved inwardly with respect to the valve body;
   a flexible membrane covering the opening and being shiftable between standby and actuate positions, with the membrane contacting and moving the actuator stem inwardly to open the valve when the membrane is shifted to the actuate position;
   wherein the opening has an inlet and an outlet, and the valve seals fluid pressure applied to the inlet and releases pressure to the outlet when the membrane is shifted to the actuate position;
   wherein the membrane forms a pressure tight compartment with the outlet; and
   wherein the body has a concave surface disposed about the opening to support the membrane in the actuate position, the concave surface forming a portion of the pressure tight compartment, and with the outlet formed in the concave surface.

2. The switch of claim 1 wherein support bars are formed in the concave surface to permit communication between the pressure tight compartment and the outlet when the membrane is in the actuate position.

3. A pneumatic membrane switch, comprising:

a body having an opening;

a tire core valve disposed within the opening, with an actuator stem extending from an end of the valve, and the actuator stem adapted to open the valve when moved inwardly with respect to the body;

a flexible membrane covering the opening and being shiftable between standby and actuate positions, with the membrane contacting and moving the actuator stem inwardly to open the valve when the membrane is shifted to the actuate position;

the opening having an inlet and an outlet, and the valve adapted to seal fluid pressure applied to the inlet and release pressure to the outlet when the membrane is shifted to the actuate position;

the membrane forming a pressure tight compartment with the outlet; and with the body having a concave surface disposed about the opening to support the membrane in the actuate position, the concave surface forming a portion of the pressure tight compartment, and with the outlet formed in the concave surface.

4. The switch of claim 3 with support bars formed in the concave surface to permit communication between the pressure tight compartment and the outlet when the membrane is in the actuate position.

* * * * *